Inventor
Thomas H. Williams

March 2, 1926.
T. H. WILLIAMS
TIRE MOLD
Filed Oct. 12, 1925     2 Sheets-Sheet 2
1,575,025
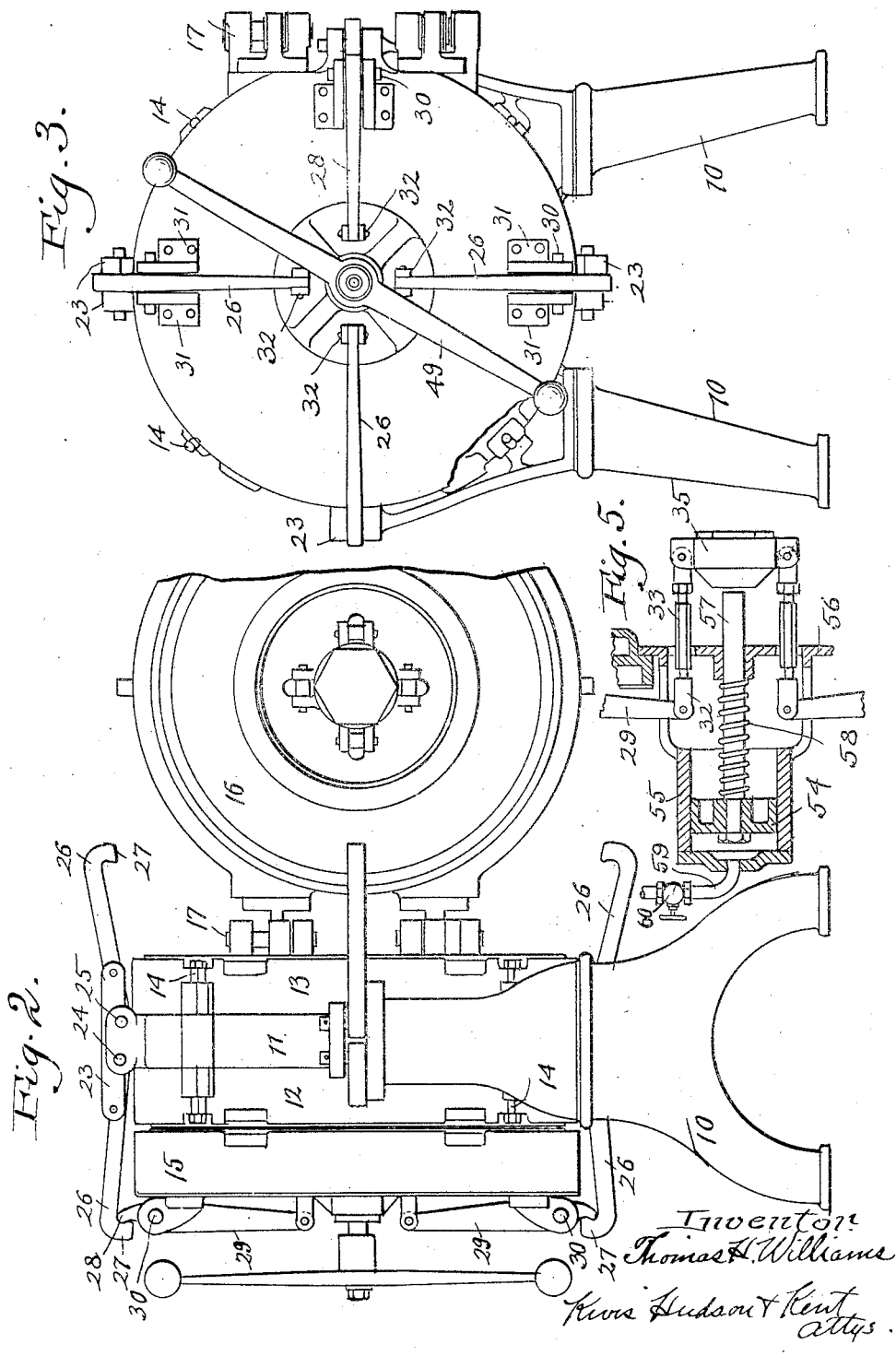

Patented Mar. 2, 1926.

1,575,025

UNITED STATES PATENT OFFICE.

THOMAS H. WILLIAMS, OF AKRON, OHIO, ASSIGNOR TO THE AKRON RUBBER MOLD & MACHINE COMPANY, OF AKRON, OHIO, A CORPORATION OF OHIO.

TIRE MOLD.

Application filed October 12, 1925. Serial No. 61,906.

*To all whom it may concern:*

Be it known that I, THOMAS H. WILLIAMS, a citizen of the United States, residing at Akron, in the county of Summit and State of Ohio, have invented a certain new and useful Improvement in Tire Molds, of which the following is a full, clear, and exact description.

This invention relates to mold apparatus and more particularly to apparatus for vulcanizing automobile tires and the like. It is one of the objects of the invention to provide improvements in the so-called watchcase type of mold whereby the mold sections may be more conveniently opened and closed, than in prior constructions, and in which the means for locking the mold sections together may be quickly and conveniently actuated for the purpose of reducing the time and labor of opening and closing the sections, as compared with prior constructions of this type.

The invention consists in certain novel combinations of elements and the mode of operation thereof, as more specifically pointed out in connection with the illustrated embodiment of my invention and defined in the claims forming a part hereof.

In the drawings, Fig. 1 is a vertical section through a mold apparatus embodying my invention;

Fig. 2 is a side elevation thereof with one of the hinged sections shown in the open position;

Fig. 3 is an end elevation;

Fig. 5 is a detail section showing a modified form of actuating mechanism for the means for locking the mold sections together.

Figures 1, 4:
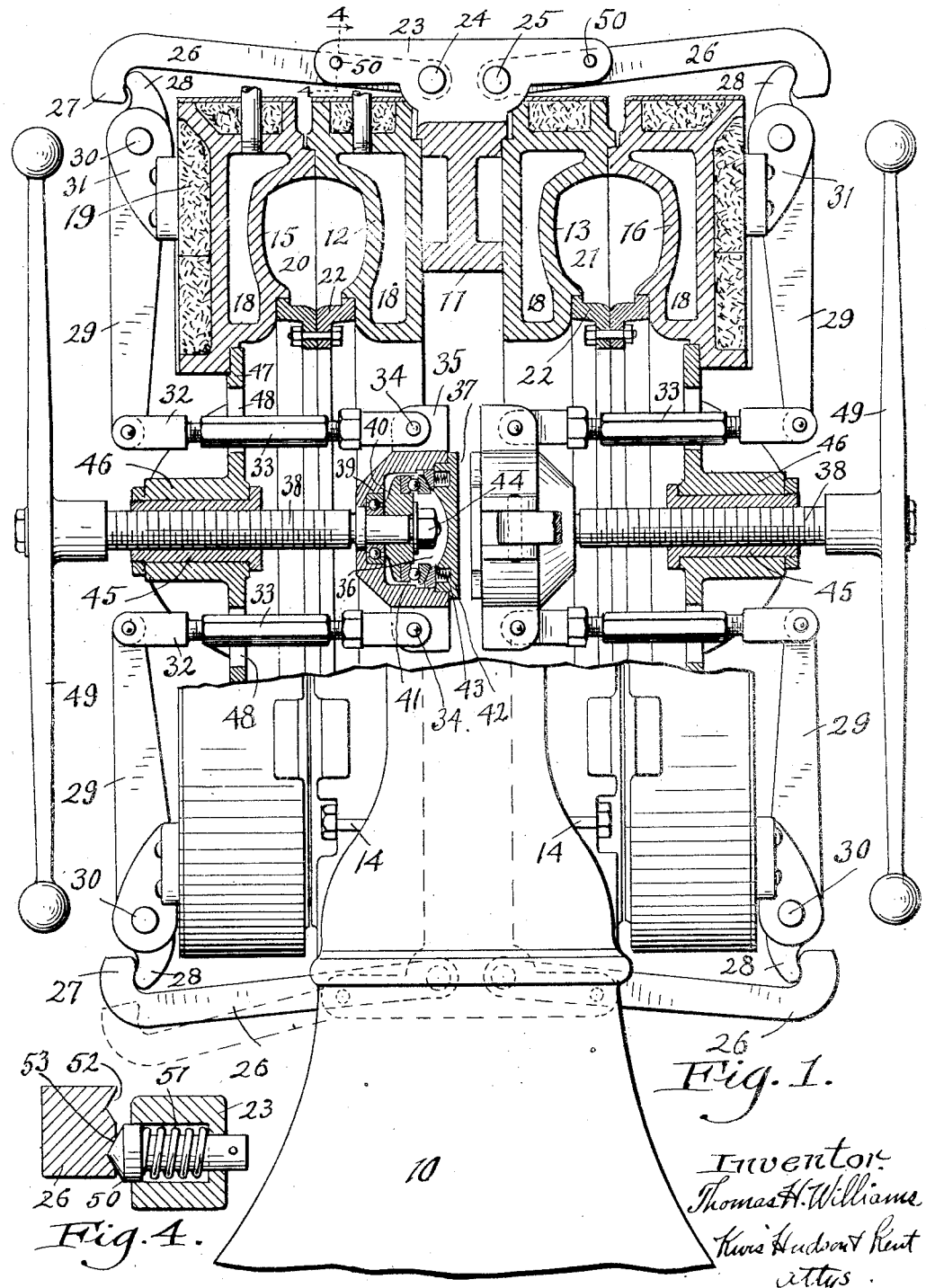
Fig. 4 is a detail section on the line 4—4 of Fig. 1.

Referring to the drawings, 10 indicates the base of the mold apparatus on which there is supported a vertically arranged stationary section 11 against the opposite sides of which the half-mold sections 12 and 13 are secured by the clamp bolts 14. Movable half-mold sections 15 and 16 are hinged to the sections 12 and 13, respectively, as indicated at 17. The mold sections 12, 13, 15 and 16 are provided with the usual jacket spaces 18, for the heating medium, and carry on their exterior suitable heat insulation, as indicated at 19, for the purpose of conserving the heat that is supplied to the mold. The inner circumference of the mold cavities 20 and 21 are closed by a bull ring 22.

The section 11 has arranged about its periphery pairs of lugs 23 which project over the sections 12 and 13, as shown in Fig. 1. Each of these pairs of lugs 23 has pivoted thereto, at the points 24 and 25, the oppositely extending arms or links 26, each of which is provided with a hook 27 at its outer end which is adapted to be engaged by the short arm 28 of one of the radially extending levers 29, these levers being fulcrumed or pivoted at the points 30, on brackets 31 that are carried by the sections 15 and 16.

As will be seen from Fig. 3, I have provided four of the radially extending levers 29 on each of the mold sections 15 and 16, the inner ends of these levers being arranged about the axis of the mold sections and each being pivotally connected there with one of the links 32 which are adjustable in length by means of the turn buckles 33 and are pivotally connected as shown at 34 to a floating member or cross-head 35. The cross-head 35 is provided with a central cavity 36, the inner end of which is closed by a cover plate 37. A screw 38 has its inner end mounted in a ball bearing 39, in the cross-head 35 and carries a collar 40 between which and the plate 37 there is a thrust bearing 41, this thrust bearing being preferably of the self-adjusting type to permit self-alignment of the parts. The plate 37, on the side facing the bearing 41, is provided with a plurality of recesses 42 in which springs 43 are arranged, these springs serving to hold the parts of the bearing 41 in their properly assembled relation. The collar 40 is secured on the screw 38 by means of the nut 44.

The screw 38 passes through the nut 45 that is carried by the hub 46 of a plate 47, the latter being bolted to the mold section 15 and having openings 48 through which the links 32 extend. The outer end of the screw 38 carries a hand lever 49 by which the screw may be rotated.

While I have described the mechanism for securing the movable mold section 15 against the stationary section 12, it will be understood that this mechanism is duplicated on the opposite side of the apparatus for the purpose of securing the movable mold section 16 against the stationary section 13, as will be clearly seen from Fig. 1.

In the operation of the apparatus, thus far described, the lever 49 is used for clamping the mold sections 12 and 15 together, as shown in Fig. 1. When it is desired to remove the tire or other article from the mold cavity 20, the screw 38 is rotated, by means of the lever 49, to move the cross-head 35 toward the left, as seen in Fig. 1, this moving the inner ends of the levers 29 toward the left and the outer ends 28 toward the right, freeing the latter from the hooks 27 and permitting these hooks to be swung radially outward, as shown in dotted lines in the lower part of Fig. 1. The mold section 15 may then be swung on its hinge away from the section 12, thus giving access to the article which remains in the mold cavity of the section 12. The article may then be removed with the bull ring 22 and another article, with a bull ring therein, is placed in the mold section 12 and the section 15 closed and clamped by swinging the arms 26 back to their former position where they cooperate with the ends 28 of the levers 29. The screw 38 is then rotated to move the cross-head 35 toward the right, as seen in Fig. 1, which causes the mold section 15 to be securely clamped against the section 12.

It will be understood that when the mold has been closed, the heating medium, such as steam, is turned into the jacket spaces and, if the article is a tire, pressure is applied to the interior of the tire, according to the usual practice, and the heat and pressure are maintained for the required period. While an article is being vulcanized in the cavity 20, the article which has been treated in the cavity 21 may be removed by opening the mold section 16, in the manner described, and another article placed in the cavity 21. In this way, the opposite sides of the apparatus are used alternately and neither side interferes either way with the other side.

It is desirable to have means for holding the arms 26 in their outer positions, where they are free from the ends 28 of the levers 29 and, in Fig. 4, I have illustrated a detent 50 which is carried by the bracket 23 and pressed against the arm 26 by means of the spring 51. The arm 26 is provided with two recesses 52 and 53 with which the detent 50 cooperates to hold the arm 26 in either of its positions. When the detent 50 engages the recess 52, the arm 26 will be held in its outer position, as shown in dotted lines in Fig. 1 and when the detent engages the recess 53, the arm 26 will be in position to engage the end 28 of the lever 29.

Instead of using the screw 38 and lever 49 for actuating the cross-head 35, I may actuate the cross-head, as shown in Fig. 5, by means of a piston 54 in a cylinder 55 which is carried by the plate 56, the latter being substituted for the plate 47, shown in Fig. 1. The piston rod 57 is connected to the cross-head 35 and a spring 58 may be provided on the piston rod for the purpose of moving the parts toward the left, as seen in Fig. 5. The piston 54 may be actuated by any available form of fluid pressure which may be supplied to the cylinder 55 by any suitable means such as the pipe 59 and the control valve 60.

Having thus described my invention, I claim:

1. In apparatus of the class described, the combination of a stationary mold section, a mold section hinged thereto, a plurality of links carried by said stationary section around the periphery thereof, levers fulcrumed on said hinged section and adapted to engage said links, a floating member arranged within said sections, links connecting said member with said levers, and means carried by said hinged section for moving said member axially of said sections.

2. In apparatus of the class described, the combination of a stationary mold section, a mold section hinged thereto, a plurality of links carried by said stationary section around the periphery thereof, levers fulcrumed on said hinged section and adapted to engage said links, a floating member arranged within said sections, adjustable links connecting said member with said levers, an axially movable member carried by said hinged section and operatively connected with the first-mentioned member to support and actuate the latter, and means for operating said axially movable member.

3. In apparatus of the class described, the combination of a stationary mold section, a mold section hinged thereto, a plurality of links carried by said stationary section around the periphery thereof, levers fulcrumed on said hinged section and adapted to engage said links, a floating member arranged within said sections, adjustable links connecting said member with said levers, and a rotatable and axially movable screw carried by said hinged section and operatively connected with the first-mentioned member to support and actuate the latter.

4. In apparatus of the class described, the combination of a stationary mold section, a mold section hinged thereto, a plurality of links carried by said stationary section around the periphery thereof, levers fulcrumed on said hinged section and adapted to engage said links, a floating member arranged within said sections, links connecting said member with said levers, means carried by said hinged section for moving said member axially of said sections, and detent means for automatically holding the first-mentioned links in and out of cooperative relation to said levers.

In testimony whereof, I hereunto affix my signature.

THOMAS H. WILLIAMS.